US012229335B2

(12) United States Patent
Shiozaki

(10) Patent No.: US 12,229,335 B2
(45) Date of Patent: Feb. 18, 2025

(54) ELECTRONIC DEVICE

(71) Applicant: CANON KABUSHIKI KAISHA, Tokyo (JP)

(72) Inventor: Tomoyuki Shiozaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 18/063,536

(22) Filed: Dec. 8, 2022

(65) Prior Publication Data

US 2023/0185371 A1   Jun. 15, 2023

(30) Foreign Application Priority Data

Dec. 13, 2021   (JP) ................................ 2021-201782

(51) Int. Cl.
| | | |
|---|---|---|
| G06F 3/01 | (2006.01) | |
| G06F 3/14 | (2006.01) | |
| G06T 7/62 | (2017.01) | |
| G06V 40/18 | (2022.01) | |

(52) U.S. Cl.
CPC ............... *G06F 3/013* (2013.01); *G06F 3/14* (2013.01); *G06T 7/62* (2017.01); *G06V 40/193* (2022.01); *G06V 2201/07* (2022.01)

(58) Field of Classification Search
CPC . G06F 3/013; G06F 3/14; G06F 3/147; G06T 7/62; G06V 40/193; G06V 2201/07; G06V 20/20; G06V 40/18; G09G 2354/00; G09G 3/003
See application file for complete search history.

(56) References Cited

U.S. PATENT DOCUMENTS

| | | | | |
|---|---|---|---|---|
| 10,607,401 | B2 * | 3/2020 | Lindh | G06T 15/20 |
| 11,388,331 | B2 * | 7/2022 | Matsuo | H04N 23/60 |
| 2011/0175932 | A1 * | 7/2011 | Yu | G06F 3/04845 345/661 |
| 2015/0130740 | A1 * | 5/2015 | Cederlund | G02B 27/01 345/173 |
| 2019/0011983 | A1 * | 1/2019 | Yasuda | G06F 3/04842 |
| 2020/0257360 | A1 * | 8/2020 | Klingström | G06F 3/013 |
| 2021/0349607 | A1 * | 11/2021 | Thunstr?m | G06F 3/013 |
| 2021/0373657 | A1 * | 12/2021 | Connor | G06T 5/90 |
| 2022/0070567 | A1 * | 3/2022 | Skoglund | G06F 3/013 |
| 2022/0326766 | A1 * | 10/2022 | Spencer | G06F 3/013 |
| 2023/0011551 | A1 * | 1/2023 | Usami | H04N 23/651 |
| 2023/0029585 | A1 * | 2/2023 | Chono | A61B 5/117 |
| 2023/0110964 | A1 * | 4/2023 | Spencer | G06F 3/011 345/156 |
| 2024/0028113 | A1 * | 1/2024 | Funamoto | G06F 3/013 |
| 2024/0037990 | A1 * | 2/2024 | Chono | G06V 40/197 |
| 2024/0069702 | A1 * | 2/2024 | Yasuda | G06F 3/167 |
| 2024/0220009 | A1 * | 7/2024 | Dryer | G06F 1/1626 |

FOREIGN PATENT DOCUMENTS

| | | |
|---|---|---|
| JP | 2018163466 A | 10/2018 |
| JP | 2019003312 A | 1/2019 |

* cited by examiner

*Primary Examiner* — Fernando Alcon
(74) *Attorney, Agent, or Firm* — Canon U.S.A., Inc., IP Division

(57) ABSTRACT

An electronic device includes: at least one memory storing instructions; and at least one processor which, upon execution of the instructions, configures the at least one processor to function as: an estimation unit configured to estimate a gaze area of a user; a detection unit configured to detect one or more objects present in a gaze direction of the user; and a selection unit configured to select one object from the one or more objects on a basis of the gaze area.

16 Claims, 10 Drawing Sheets

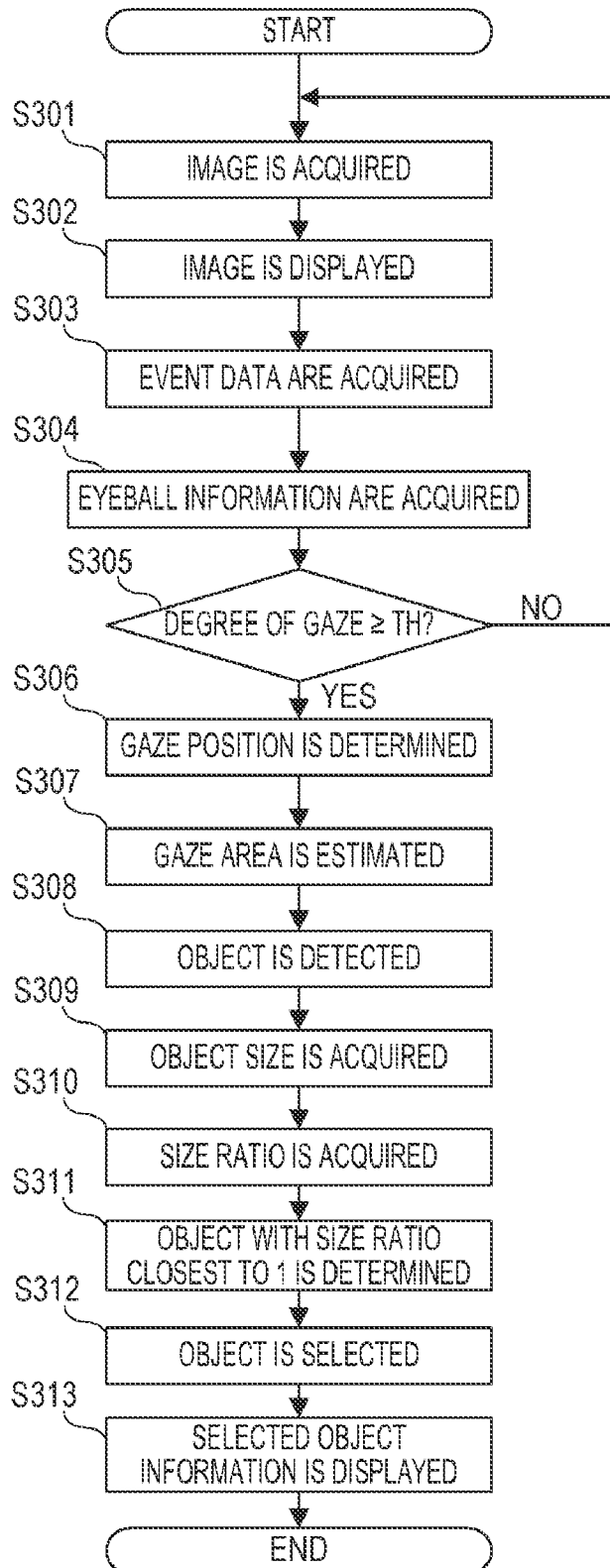

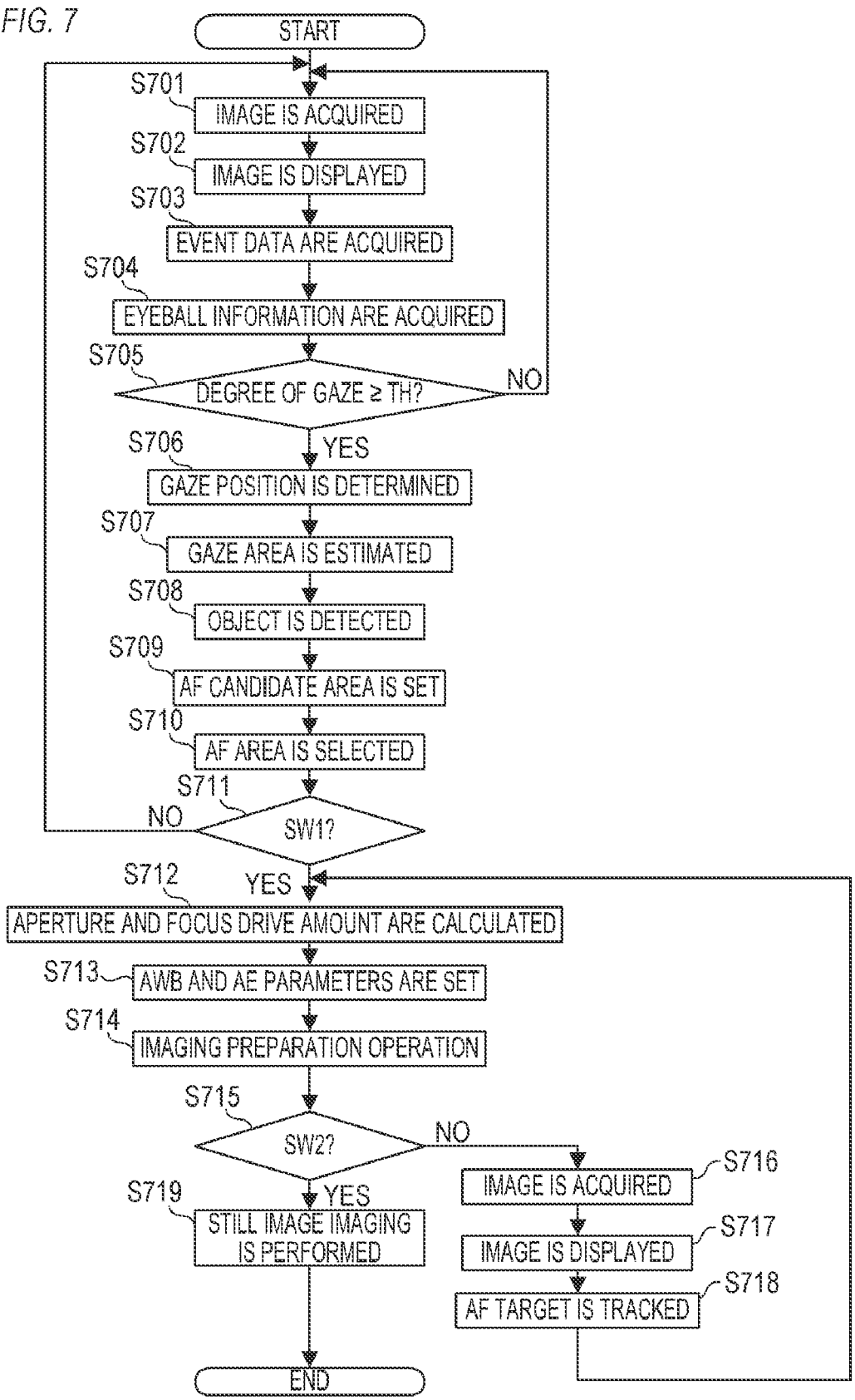

ELECTRONIC DEVICE

BACKGROUND

Technical Field

The present disclosure relates to an electronic device such as a head-mounted display (HMDs) and a camera, and to a technique for selecting objects and areas.

Description of the Related Art

Japanese Patent Application Publication No. 2018-163466 discloses that a glasses-type wearable device, which is a type of head-mounted display (HMD), displays a three-dimensional drawing to be superimposed on an actual object. Japanese Patent Application Publication No. 2019-3312 discloses that an in-vehicle device selects a gaze target based on the direction of user's line of sight and movement history. Convenience of electronic devices such as HMDs and cameras can be improved by selecting an object or area viewed by a user and performing control according to the selection result.

However, even if the user is looking at the same position, the object or area the user wants to select (the object or area the user is looking at) will differ depending on the way of looking. In conventional techniques such as the technique disclosed in Japanese Patent Application Publication No. 2019-3312, since such different ways of looking cannot be distinguished, there are cases where the selection that matches the user's intention is not made.

SUMMARY

The present disclosure provides a technique that enables selection that matches the user's intention.

An electronic device according to the present disclosure, includes: at least one memory storing instructions; and at least one processor which, upon execution of the instructions, configures the at least one processor to function as: an estimation unit configured to estimate a gaze area of a user; a detection unit configured to detect one or more objects present in a gaze direction of the user; and a selection unit configured to select one object from the one or more objects on a basis of the gaze area.

Further features of the present disclosure will become apparent from the following description of exemplary embodiments with reference to the attached drawings.

BRIEF DESCRIPTION OF THE DRAWINGS

FIG. 3 is a flowchart showing an operation example of the wearable device.

FIG. 7 is a flowchart showing an operation example of the digital camera.

DESCRIPTION OF THE EMBODIMENTS

Embodiment 1

Embodiment 1 of the present disclosure will be described below. As Embodiment 1, an example in which the present disclosure is applied to a wearable device such as a head-mounted display (HMD) will be described.

Figure 1:
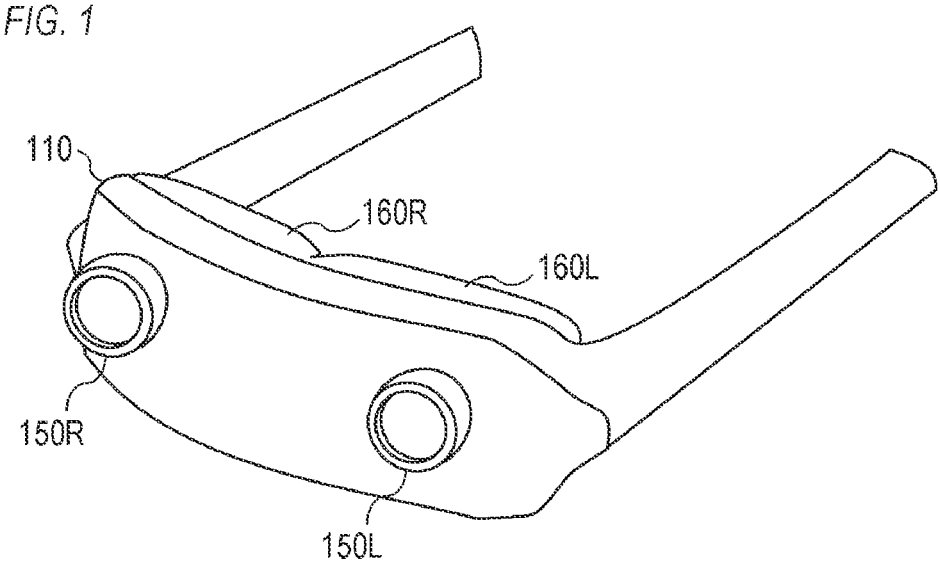
FIG. 1 is an external view of a wearable device.

FIG. 1 is an external view of a wearable device 110 as an example of an electronic device to which the present disclosure can be applied. In FIG. 1, each of a right-eye image capturing unit 150R and a left-eye image capturing unit 150L includes a lens 103 and an image capturing unit 22, which will be described hereinbelow. Each of the right-eye image capturing unit 150R and the left-eye image capturing unit 150L is equipped with a zoom mechanism, and the user can change the zoom magnification of the right-eye image capturing unit 150R and the left-eye image capturing unit 150L by using an operation unit 70 described hereinbelow. The wearable device 110 can perform, as a zoom operation, optical zoom that controls the lens position by the zoom mechanism, electronic zoom that cuts out and enlarges a part of a captured image, or a combination thereof. Each of the right-eye display unit 160R and the left-eye display unit 160L includes an eyepiece unit 16, an EVF 29 (Electric View Finder), and an eyeball detection unit 161, which will be described hereinbelow. With the wearable device 110 worn, the user visually recognizes an image (right-eye image) displayed on the right-eye display unit 160R with the right eye, and an image (left-eye image) displayed on the left-eye display unit 160L with the left eye. For example, an image captured by the right-eye image capturing unit 150R is displayed on the right-eye display unit 160R, and an image captured by the left-eye image capturing unit 150L is displayed on the left-eye display unit 160L.

Figure 2:
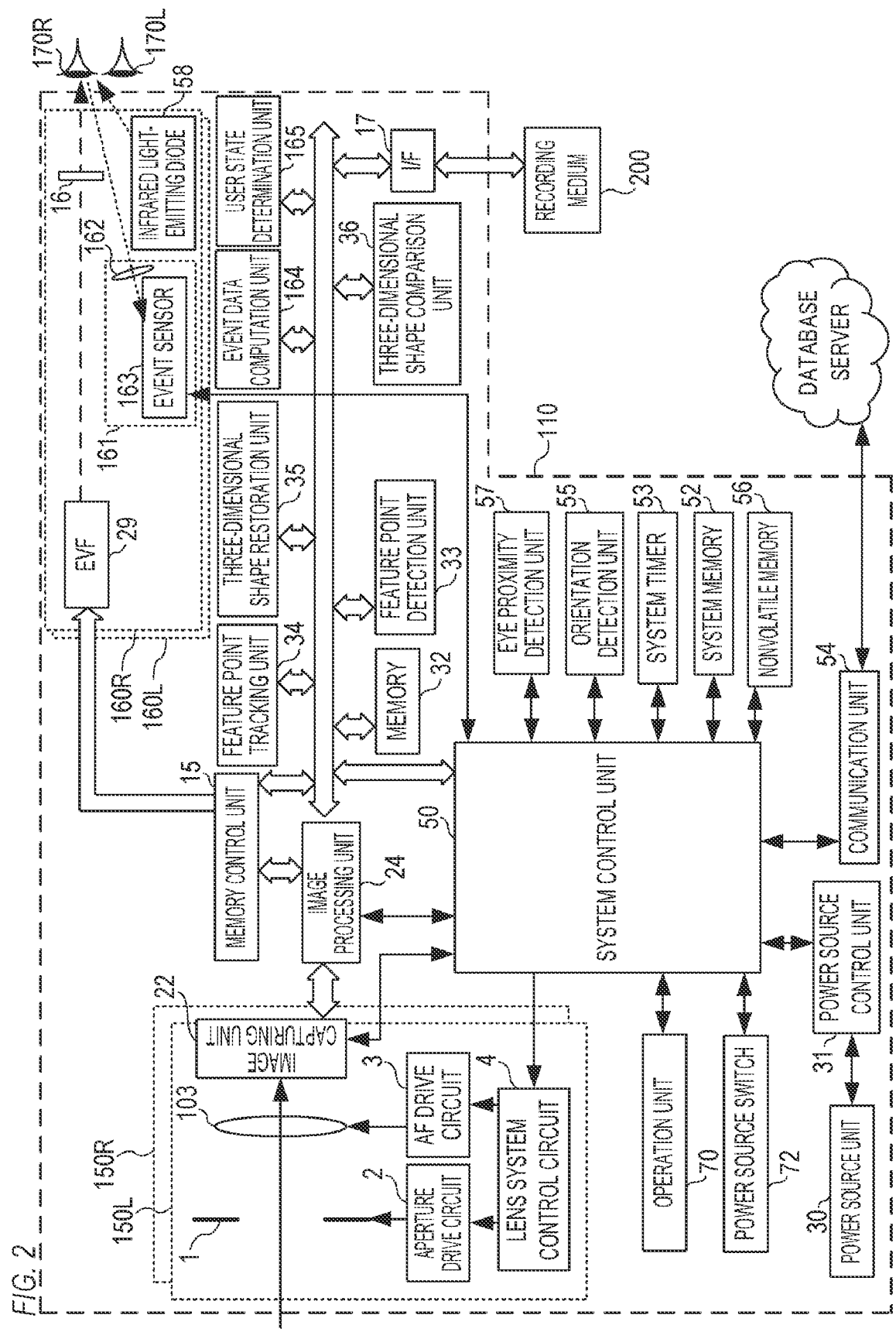
FIG. 2 is a block diagram showing a configuration example of the wearable device.

FIG. 2 is a block diagram showing a configuration example of the wearable device 110. Although the lens 103 is composed of a plurality of lenses, only one lens is shown in FIG. 2 for the sake of simplicity. A system control unit 50 communicates with a lens system control circuit 4 and controls an aperture 1 via an aperture drive circuit 2. Further, the system control unit 50 focuses the object by displacing a focus lens included in the lens 103 via an AF drive circuit 3.

The image capturing unit 22 is an image capturing device (image capturing sensor) composed of a CCD, a CMOS device, or the like that converts an optical image into an electrical signal. The image capturing unit 22 is provided with an A/D converter (not shown), and the A/D converter is used to convert analog signals output from the image capturing unit 22 into digital signals. Image capturing by the image capturing unit 22 is performed in synchronization with a horizontal synchronizing signal and a vertical synchronizing signal output from a timing generator (not shown), and the image capturing unit 22 outputs image data of one frame as frame data in the period of the vertical line synchronization signal. While the event sensor 163, which will be described hereinbelow, is an event-based vision sensor (asynchronous event-based sensor), the image capturing unit 22 is a synchronous frame-based sensor.

An image processing unit 24 performs predetermined processing (resize processing such as pixel interpolation and reduction, color conversion processing, and the like) on data from the image capturing unit 22 (A/D converter) or data from a memory control unit 15, which will be described hereinbelow. The image processing unit 24 performs predetermined computations using captured image data, and the system control unit 50 performs exposure control and distance measurement control based on the computation results obtained by the image processing unit 24. As a result, TTL (through-the-lens) AF (autofocus) processing and AE (automatic exposure) processing are performed. The image processing unit 24 further performs predetermined computations using the captured image data and performs TTL AWB (Auto White Balance) processing based on the obtained computation result. Further, the image processing unit 24 can perform picture style processing for converting a captured image (image data) into a color image, a monochrome image, or the like.

The memory control unit 15 controls transmission and reception of data between the image capturing unit 22, the image processing unit 24 and a memory 32. Output data from the image capturing unit 22 are written into the memory 32 via the image processing unit 24 and the memory control unit 15 or via the memory control unit 15 without the image processing unit 24. The memory 32 stores image data obtained by the image capturing unit 22 and image data to be displayed on the EVF 29. The memory 32 also serves as an image display memory (video memory). The image data for display written in the memory 32 are displayed by the EVF 29 via the memory control unit 15.

The EVF 29 performs display according to the signal from the memory control unit 15 on a display device such as LCD or organic EL. By sequentially transferring the image data accumulated in the memory 32 to the EVF 29 and displaying the transferred data, a through display of the captured image can be performed. The eyepiece unit 16 is an eyepiece unit of an eyepiece finder (looking-in type finder), and the user can visually recognize an image displayed on the EVF 29 through the eyepiece unit 16. Through display is the same as live view display in general digital cameras, and in through display, captured images are displayed almost without delay. The user can visually recognize the real space indirectly by visually recognizing the through-displayed video.

A nonvolatile memory 56 is an electrically erasable/recordable memory, such as a Flash-ROM. The nonvolatile memory 56 stores constants, programs, and the like for the operation of the system control unit 50. The program as referred to herein is a program for executing the processing of various flowcharts to be described hereinbelow.

The system control unit 50 consists of at least one processor or circuit and controls the wearable device 110 as a whole. The system control unit 50 implements each process described hereinbelow by executing a program recorded in the nonvolatile memory 56. A system memory 52 is, for example, a RAM, and the system control unit 50 expands constants and variables for operation of the system control unit 50, programs read from the nonvolatile memory 56, and the like into the system memory 52. Further, the system control unit 50 performs display control by controlling the memory 32, the EVF 29, and the like.

A system timer 53 is a timing unit that measures the time used for various controls and the time of a built-in clock.

An operation unit 70 includes various operation members as input units that receive operations (user operations) from the user. The operation unit 70 includes, for example, an audio UI and a touch pad. The touch pad is mounted on the side (not shown) of the wearable device 110. The system control unit 50 can detect an operation on the touch pad or the state of the touch pad. The coordinates of the position where a finger touches the touch pad are notified to the system control unit 50 through an internal bus, and the system control unit 50 determines what kind of operation (touch operation) is performed on the touch pad based on the notified information. The touch pad can be of any type among various types of touch panels such as resistive film type, capacitive type, surface acoustic wave type, infrared type, electromagnetic induction type, image recognition type, and optical sensor type.

A power switch 72 is an operation member that switches the power of the wearable device 110 between ON and OFF.

A power supply control unit 31 is composed of a battery detection circuit, a DC-DC converter, a switch circuit for switching blocks to be energized, and the like, and detects whether a battery is installed, the type of battery, and the remaining power in the battery. Also, the power supply control unit 31 controls the DC-DC converter based on the detection result and an instruction from the system control unit 50 and supplies necessary voltage to each unit including a recording medium 200 for a necessary period. A power supply unit 30 includes a primary battery such as an alkaline battery or a lithium battery, a secondary battery such as a NiCd battery, a NiMH battery, or a lithium ion battery, an AC adapter, or the like.

A recording medium I/F 17 is an interface with a recording medium 200 such as a memory card or hard disk. The recording medium 200 is a recording medium such as a memory card for recording captured images, and is composed of a semiconductor memory, a magnetic disk, or the like.

A communication unit 54 transmits and receives video signals and audio signals to and from an external device connected wirelessly or by a wired cable. The communication unit 54 can also transmit and receive data to and from an external database server. For example, the database server may store three-dimensional CAD data (three-dimensional drawing data) which is the work object. In this case, a three-dimensional drawing can be displayed on the EVF 29 to be superimposed on the work object (actual object), for example, an image in which the three-dimensional drawing is superimposed on the work object can be displayed on the EVF 29. The communication unit 54 can be connected to a wireless LAN (Local Area Network) and the Internet. Also, the communication unit 54 can communicate with an external device using Bluetooth (registered trademark) or Bluetooth Low Energy.

An orientation detection unit 55 detects the orientation of the wearable device 110 with respect to the direction of gravity. An acceleration sensor, a gyro sensor, or the like can be used as the orientation detection unit 55. The orientation detection unit 55 can detect the movement of the wearable device 110 (pan, tilt, roll, whether it is stationary, and the like).

An eye proximity detection unit 57 is a sensor that detects whether the wearable device 110 is worn by the user. The system control unit 50 can switch activation (power-on)/stop (power-off) of the wearable device 110 according to the state detected by the eye proximity detection unit 57. The eye proximity detection unit 57 may be configured to detect the approach of any object to the eyepiece unit 16 using, for example, an infrared proximity sensor. When an object approaches, an infrared ray projected from a light projecting unit (not shown) of the eye proximity detection unit 57 is reflected and received by a light receiving unit (not shown) of the infrared proximity sensor. It is also possible to determine the distance from the eyepiece unit 16 to which the object has approached by the amount of received infrared rays. The infrared proximity sensor is merely an example, and other sensors such as a capacitive sensor may be employed as the eye proximity detection unit 57.

A feature point extraction unit 33 extracts (detects) feature points (point group) from the image data calculated by the image processing unit 24. Information on the feature points extracted for each frame by the feature point extraction unit 33 is stored in the memory 32. Methods such as SIFT (Scale-Invariant Feature Transform), FAST (Features ROM accelerated segment test), and ORB (Oriented FAST and Rotated BRIEF) are used as methods for extracting feature points. As the extracted feature point information, for example, a feature amount (characteristic amount) descriptor for calculating a binary vector capable of fast matching with less memory, such as BRIEF (Binary Robust Independent Elementary Features), is stored.

A feature point tracking unit 34 reads the feature points (feature point information) stored in the memory 32 and compares them with the feature points extracted from the image data of the newly captured frame. In this way, feature point matching is performed between a plurality of images. As a matching method, for example, a full search method (Brute-Force matcher), an approximate nearest neighbor search method (FLANN based matcher), and a Mean-Shift search method are used.

From a plurality of captured image data, a three-dimensional shape restoration unit 35 restores the three-dimensional shape of scenes (captured scenes) thereof. Methods such as SfM (Structure from Motion) and SLAM (Simultaneous Localization and Mapping) are used as three-dimensional shape restoration methods. In either method, the feature point tracking unit 34 performs feature point matching (association of feature points between a plurality of images) between a plurality of images for which the wearable device 110 has different orientations and positions. Then, the three-dimensional shape restoration unit 35 performs optimization using, for example, Bundle Adjustment, to estimate the three-dimensional positions of the matched feature points (three-dimensional point group data), the position of the wearable device 110, and the orientation of the wearable device 110. The three-dimensional shape restoration unit 35 may improve the accuracy of estimating the three-dimensional point group data, the position of the wearable device 110, and the orientation of the wearable device 110 by a method such as Visual Inertial SLAM that uses the output of the orientation detection unit 55 for optimization.

A three-dimensional shape comparison unit 36 aligns and compares the shape indicated by the three-dimensional point group (three-dimensional point group data) generated by the three-dimensional shape restoration unit 35 and the shape of the target object indicated by the three-dimensional CAD data stored in an external database server or the like. For alignment, an ICP (Iterative Closest Point) algorithm or the like may be used. This makes it possible to check which coordinate position corresponds to each feature point extracted by the feature point extraction unit 33 in the coordinate system of the three-dimensional CAD data. Also, the position and orientation of the wearable device 110 at the time each image data were captured can be estimated from the arrangement of the target object and the three-dimensional point group.

An object identification unit 167 analyzes the image data obtained by the image capturing unit 22 and identifies the type of object. The object identification unit 167 can also specify the size of the object on the image and the position of the object on the image. The object identification unit 167 performs the above processing by using, for example, a convolutional neural network widely used for image recognition.

An eyeball detection unit 161 is composed of an eyeball detection lens 162, an event sensor 163, and an event data computation unit 164, which will be described hereinbelow. The eyeball detection unit 161 can acquire eyeball information regarding the state of the user's eyes (right eye 170R and left eye 170L) looking into the finder.

The infrared light emitted from an infrared light-emitting diode 58 is reflected by the user's eyes, and the reflected infrared light passes through the eyeball detection lens 162 and forms an image on the image capturing surface of the event sensor 163.

The event sensor 163 is an event-based vision sensor that detects changes in the brightness of light incident on each pixel and outputs information on pixels where the brightness has changed, asynchronously with other pixels. The data output from the event sensor 163 include, for example, the position coordinates of the pixel where the brightness change (event) occurred, the polarity of the brightness change (positive or negative), and timing information corresponding to the event occurrence time. These data are hereinafter referred to as event data. As compared with a synchronous frame-based sensor such as the image capturing unit 22, the event sensor 163 eliminates redundancy of output information and features high-speed operation, high dynamic range, and low power consumption. Meanwhile, since event data (information on pixels where brightness has changed) are output asynchronously with other pixels, special processing is required to determine the relationship between event data. In order to determine the relationship between event data, it is necessary to accumulate the event data output from the event sensor 163 over a predetermined period of time and perform various arithmetic processing on the result.

The event data computation unit 164 is for acquiring (detecting) eyeball information on the basis of event data continuously and asynchronously output from the event sensor 163. For example, the event data computation unit 164 acquires eyeball information by accumulating event data occurring during a predetermined period of time and processing these data as a set of data. By changing the accumulation time for accumulating the event data, it is possible to acquire a plurality of pieces of eyeball information with different occurrence speeds. The eyeball information includes, for example, line-of-sight position information related to the line-of-sight position (the position at which the user is looking; gaze position), saccade information related to the direction and speed of saccades, and microsaccade information about the occurrence frequency and amplitude of microsaccades (amount of change in line-of-sight position). The eyeball information may include information about eyeball movements other than saccades and microsaccades, pupillary information about the size of the pupil and changes thereof, blink information about the speed and number of blinks, and the like. These pieces of information are merely examples, and the eyeball information is not limited to these pieces of information. The event data computation unit 164 may map the event data for the accumulation time as one frame of image data on the basis of the event occurrence coordinates (the position coordinates of the pixel where the brightness change (event) occurred) and perform image processing. With such a configuration, it is possible to acquire eyeball information from one frame of image data obtained by mapping event data for an accumulation time by frame-based image processing.

A user state determination unit 165 determines the user state on the basis of the eyeball information obtained by the event data computation unit 164. For example, it is possible to determine the size (width) of the gaze area or the degree of gaze (the degree of bird's-eye view) from the occurrence frequency and amplitude of microsaccades. Here, the gaze area is synonymous with the caution area and the attention area. The degree of gaze is an index that is higher in a case where the gaze area is narrower and lower in a case where the gaze area is wider. The bird's-eye view degree is defined as an antonym of the gaze degree. In addition, it is possible to determine the degree of concentration (state of concentration) or fatigue of the user from the frequency and amplitude of occurrence of microsaccades, the size and amount of change in the pupil, and the speed and number of blinks. In addition, the user's excitement level is related to the speed of microsaccades and the diameter of the pupil and can be determined from both parameters. For example, the degree of excitement is an index that increases in a case where the user is looking at an object with a high degree of preference (favorite face etc.) and decreases in a case where the user is looking at an object with a low degree of preference, and therefore can be considered as a degree of preference. The user state determination unit 165 can be configured of a neural network or the like that inputs parameters related to, for example, eyeball information and identification results of the object identification unit 167, and outputs information related to the above-described user state (hereinafter referred to as user state information). However, the configuration of the user state determination unit 165 is not limited to the configuration described above. The eyeball information used by user state determination unit 165 and the determination result of the user state determination unit 165 are not limited to those described above.

A line-of-sight input setting unit 166 enables or disables the processing of the eyeball detection unit 161 via the system control unit 50. The line-of-sight input setting unit 166 can also set parameters and conditions related to the processing of the event data computation unit 164 and the user state determination unit 165. For example, the user can arbitrarily perform these settings from a menu screen or the like.

In addition, the system control unit 50 can obtain information on the area of the EVF 29 on which the imaged object is displayed and in what size. Furthermore, the eyeball detection unit 161 can also obtain information on the area of the EVF 29 to which the line of sight (gaze) is directed. This allows the system control unit 50 to determine the area of the object at which the user is looking.

FIG. 3 is a flowchart showing an operation example of the wearable device 110. Each process in the flowchart of FIG. 3 is implemented by the system control unit 50 expanding the program stored in the nonvolatile memory 56 into the system memory 52 and executing the expanded program to control each functional block. For example, when the wearable device 110 detects that the wearable device 110 is worn by the user, the operation of FIG. 3 is started.

In step S301, the system control unit 50 acquires an image (image data) captured by the image capturing unit 22 (image sensor).

In step S302, the system control unit 50 displays the image acquired in step S301 on the EVF 29.

In step S303, the system control unit 50 acquires event data output from the event sensor 163.

In step S304, the system control unit 50 controls the event data computation unit 164 to acquire eyeball information on the basis of the event data acquired in step S303.

In step S305, the system control unit 50 controls the user state determination unit 165 to determine the degree of gaze on the basis of the eyeball information acquired in step S304, and determines whether the degree of gaze is equal to or greater than a predetermined threshold TH. For example, the user state determination unit 165 determines the size of the gaze area from the occurrence frequency and amplitude of microsaccades, and determines the degree of gaze to be higher as the gaze area is smaller. The system control unit 50 advances the process to step S306 when it is determined that the degree of gaze is equal to or greater than the threshold TH, and returns the process to step S301 when it is determined that the degree of gaze is less than the threshold TH. The system control unit 50 may determine whether the fixation time of the line-of-sight position (time during which the line-of-sight position hardly moves) has exceeded a predetermined time. In this case, the process may be returned to step S301 if the fixation time of the line-of-sight position has not exceeded the predetermined time, and the process may proceed to step S306 if the fixation time of the line-of-sight position has exceeded the predetermined time.

In step S306, the system control unit 50 determines, as the gaze position, the line-of-sight position for which the degree of gaze is determined in step S305 to be equal to or greater than the threshold TH.

In step S307, the system control unit 50 controls the user state determination unit 165 to estimate the gaze area on the basis of the gaze position determined in step S306. As described above, the size of the gaze area can be estimated based on the eyeball information. The user state determination unit 165 estimates, for example, an area having the estimated size around the gaze position as the gaze area.

In step S308, the system control unit 50 detects one or more objects present in the direction of the user's line of sight (gaze direction). For example, the system control unit 50 detects an object that overlaps the gaze area estimated in step S307. The system control unit 50 may compare the image acquired in step S301 with the gaze area estimated in step S307 to detect an object from the image. The system control unit 50 may control the three-dimensional shape comparison unit 36 so as to compare the three-dimensional drawing with the gaze area and detect objects from the three-dimensional drawing.

In steps S309 to S311, based on the gaze area estimated in step S307, the system control unit 50 selects one object from the one or more objects detected in step S308. Where one object is detected in step S308, that object may be selected. When a plurality of objects is detected in step S308, the system control unit 50 compares the size of the gaze area and the size of each of the plurality of objects to select one object.

In step S309, the system control unit 50 acquires (calculates) the size of each object detected in step S308. The size of the object is, for example, the size on the image obtained in step S301.

In step S310, the system control unit 50 acquires (calculates) the ratio (size ratio) between the size of the gaze area and the size of each object acquired in step S309. The size ratio is, for example, the ratio of the size of the gaze area and the size of the object on the image acquired in step S301. The size ratio may be a value obtained by dividing the size of the gaze area by the size of the object or may be a value obtained by dividing the size of the object by the size of the gaze area.

In step S311, the system control unit 50 determines (detects) the object with the size ratio obtained in step S310 that is closest to 1.

In step S312, the system control unit 50 selects the object determined in step S311.

In step S313, the system control unit 50 controls to perform processing based on the selection result of step S312. For example, the system control unit 50 displays information about the selected object on the display (EVF 29) or makes the area of the selected object identifiable by highlight display, frame display, or the like. The estimated gaze area may be identifiable.

Figure 4B:
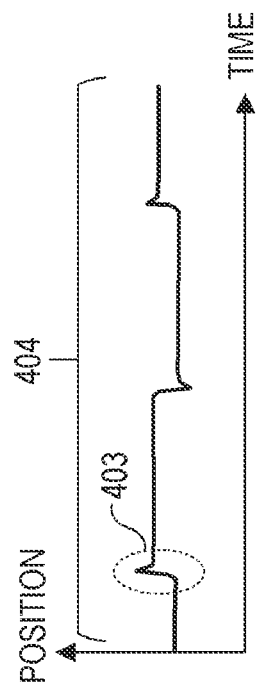
FIGS. 4A to 4D are diagrams for explaining a specific example of the operation of the wearable device.
Figure 4A:
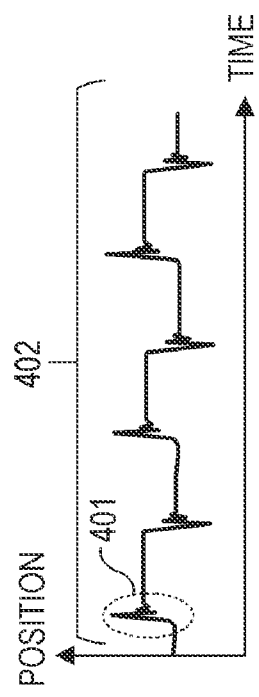

A specific example of the operation of the wearable device 110 will be described using FIGS. 4A to 4D. FIG. 4A is a graph showing an example of a microsaccade waveform in a case where the gaze area is relatively wide, and FIG. 4B is a graph showing an example of the microsaccade waveform in a case where the gaze area is relatively narrow. The vertical axis in FIGS. 4A and 4B indicates the pupil center position (rotational angle of the eyeball around the center of the eyeball), and the horizontal axis in FIGS. 4A and 4B indicates time. A microsaccade waveform indicates a change in the pupil center position when microsaccades occurs. A portion 401 (FIG. 4A) and a portion 403 (FIG. 4B) of the microsaccade waveform correspond to the timing at which the microsaccades occurs. As shown in FIG. 4A, the wider the gaze area, the larger the amplitude of the microsaccades tends to be, and the wider the gaze area, the higher the vibratory property of the microsaccades (the smaller the attenuation rate) tends to be. In addition, as shown by six microsaccades occurring in a period 402, the wider the gaze area, the higher the occurrence frequency of the microsaccades tends to be. As shown in FIG. 4B, the narrower the gaze area, the smaller the amplitude of the microsaccades tends to be, and the narrower the gaze area, the lower the vibratory property of the microsaccades (the greater the attenuation rate) tends to be. Also, the narrower the gaze area, as in the case where microsaccades occur only three times in a period 404 that is of the same length as the period 402, the lower the occurrence frequency of the microsaccades tends to be. Because of these tendencies (the larger the gaze area, the larger the microsaccades tend to be), the size (width) of the gaze area can be estimated from the amplitude and occurrence frequency of the microsaccades.

Figure 4D:
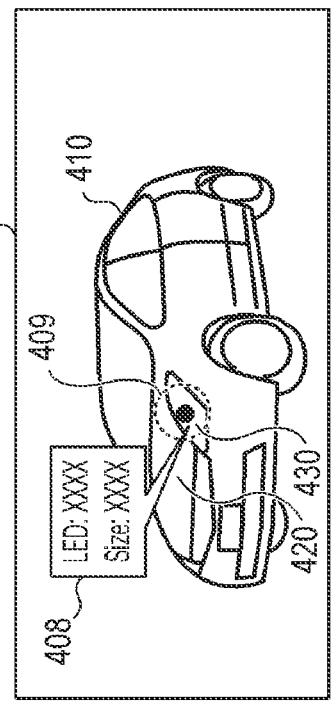
Figure 4C:
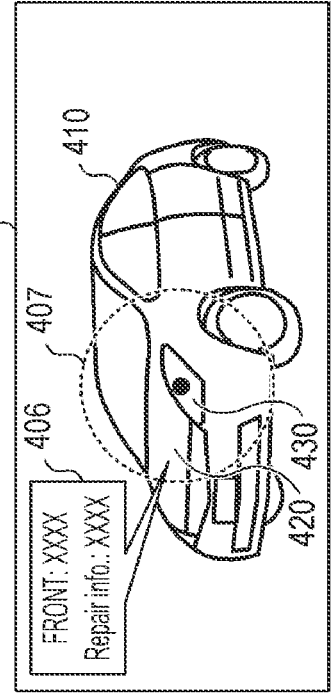

FIG. 4C shows a display example of the EVF 29 in a case where the gaze area is relatively wide. An image 405 is the image displayed in step S302 of FIG. 3 and includes a car 410. An area 407 is the gaze area estimated in step S307, and the black dot located at the center of the area 407 is the gaze position determined in step S306. In FIG. 4C, it is assumed that three objects, that is, the car 410, a front part 420, and a LED lamp 430 are detected in step S309. Since the object for which the size ratio to the gaze area is closest to 1 is the front part 420, the front part 420 is selected in step S312. Therefore, in FIG. 4C, information 406 linked to the front part 420 (for example, the model and repair history of the front part 420) is displayed.

FIG. 4D shows a display example of the EVF 29 in a case where the gaze area is relatively narrow. An area 409 is the gaze area estimated in step S307, and the black dot located at the center of the area 409 is the gaze position determined in step S306. Also in FIG. 4D, as in FIG. 4C, it is assumed that three objects, that is, the car 410, the front part 420, and the LED lamp 430 are detected in step S309. However, since the object for which the size ratio to the gaze area is closest to 1 is the LED lamp 430 rather than the front part 420, the LED lamp 430 is selected in step S312. Therefore, in FIG. 4D, information 408 associated with the LED lamp 430 (for example, the model and size of the LED lamp 430) is displayed.

In this way, in a case where the user's gaze area is large, a larger object is selected than in a case where the user's gaze area is small. In other words, in a case where the gaze area is small, a smaller object is selected as compared to a case where the user's gaze area is large. As described above, the larger the gaze area, the larger the microsaccades tend to be. Thus, in a case where the user's microsaccades are large, a larger object is selected as compared to a case where the microsaccades are small. For example, in a case where the amplitude of the microsaccades is large, a larger object is selected as compared to a case where the amplitude of the microsaccades is small. In a case where the occurrence frequency of the microsaccades is large, a larger object is selected as compared to a case where the occurrence frequency of the microsaccades is small. In a case where the attenuation rate of the microsaccades is small (high vibratory property), a larger object is selected as compared to a case where the attenuation rate of the microsaccades is large (low vibratory property).

As described above, according to Embodiment 1, one object is selected from one or more objects present in the direction of the line of sight of the user on the basis of the gaze area of the user. This enables a selection that matches the user's intention. For example, it is possible to estimate the user's intended work object and present only the information the user needs. Since display of unnecessary information such as information related to objects that are not work objects can be suppressed, display complexity can be suppressed. Meanwhile, it is possible to display only the information about the intended work object, so that the amount of information about the work object can be increased. As a result, the efficiency of information acquisition by the user (efficiency when the user acquires necessary information) can be improved.

In addition, in Embodiment 1, the configuration is such that the object for which the size ratio to the gaze area is closest to 1 is selected, but the present disclosure is not limited to this configuration. For example, a parameter different than the size ratio may be used to select the object for which the size is closest to the size of the gaze area. A configuration may be adopted in which an object for which the size ratio to the gaze area is within a predetermined range is selected. Where the size of the gaze area is larger than a predetermined threshold, it can be determined that the user has a bird's-eye view of the scene, so in such a case the object may not be selected. By doing so, it is possible to further suppress display complexity.

In the configuration of Embodiment 1, the image displayed on the EVF 29 is viewed by the user, but the present disclosure is not limited to this configuration. For example, the present disclosure can also be applied to a configuration in which the user directly visually recognizes the actual space as in a see-through type head-mounted display. In that case, for example, as the above-described size ratio, the ratio between the actual object size on the display surface (the size of the area where the object is projected onto the display surface) and the size of the gaze area on the display surface may be calculated as the above-described size ratio. A single virtual plane may be set in the actual space, and the ratio between the size of the object on the virtual plane (the size of the area where the object is projected onto the virtual plane) and the size of the gaze area on the virtual plane may be calculated as the size ratio. These projection calculations and the like are performed by the three-dimensional shape comparison unit 36.

In the configuration of Embodiment 1, the image picked up by the image capturing unit 22 is displayed on the EVF 29, but the present disclosure is not limited to this configuration. For example, the present disclosure can also be applied to a head-mounted display that does not include the image capturing unit 22. A moving image (moving image data) stored in the recording medium 200 may be obtained and reproduced and displayed on the EVF 29.

In the configuration of Embodiment 1, the information about the selected object (object that has been selected) is displayed on the EVF 29, but the present disclosure is not limited to this configuration. For example, the frame rate, lightness, contrast, and display color of the EVF 29 may be changed according to the selected object. By setting the display parameters according to the selected object, the visibility of the selected object or the like is improved. Foveated rendering may be performed such that the resolution decreases with distance from the selected object while a high resolution of the selected object is maintained. By doing so, it is possible to decrease the amount of data transfer, reduce the rendering process, and lower the power consumption. Also, the image capturing unit 22 may be controlled according to the selected object. For example, by changing the frame rate (image capturing rate) according to the motion of the selected object, it is possible to lower the power consumption when imaging a still object. AE processing, AF processing, and parameters of the image processing unit 24 may be changed according to the selected object. By implementing appropriate exposure control, focus control, and image processing corresponding to the selected object, the visibility of the selected object and the like is improved.

Embodiment 2

Embodiment 2 of the present disclosure will be described hereinbelow. In Embodiment 2, members that play the same role as in Embodiment 1 are given the same reference numerals as in Embodiment 1, and the description thereof is omitted. Members and configurations different from those of Embodiment 1 will be described in detail.

Figure 5A:
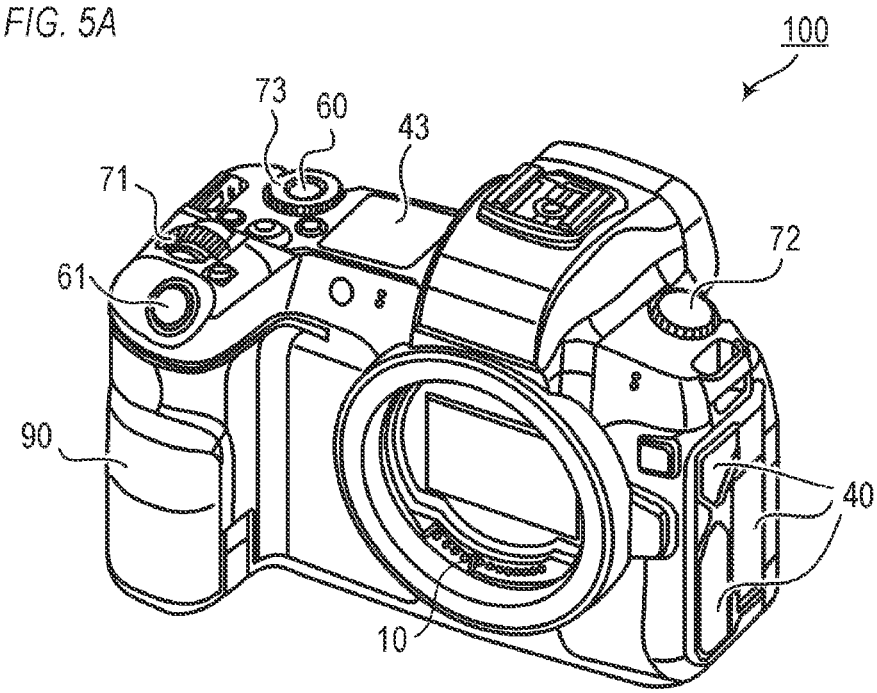
FIGS. 5A and 5B are external views of a digital camera.
Figure 5B:
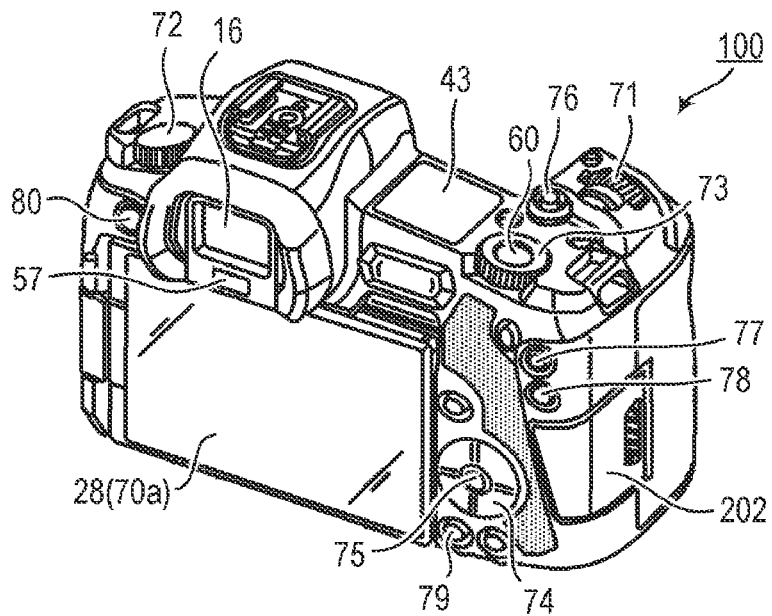

FIGS. 5A and 5B show the external appearance of a digital camera 100 as an example of electronic device to which the present disclosure can be applied. FIG. 5A is a front perspective view of the digital camera 100, and FIG. 5B is a back perspective view of the digital camera 100.

A display unit 28 is provided on the back surface of the digital camera 100 and displays images and various information. A touch panel 70a can detect a touch operation on the display surface (operation surface) of the display unit 28. A viewfinder external display unit 43 is provided on the upper surface of the digital camera 100 and displays various setting values of the digital camera 100 such as shutter speed and aperture. A shutter button 61 is an operation member for performing imaging instruction. A mode changeover switch 60 is an operation member for switching between various modes. A terminal cover 40 protects a connector (not shown) for connecting the digital camera 100 to an external device.

The main electronic dial 71 is a rotary operation member, and by turning the main electronic dial 71, setting values such as shutter speed and aperture can be changed. The power switch 72 is an operation member for switching the power of the digital camera 100 between ON and OFF. A sub-electronic dial 73 is a rotary operation member, and by rotating the sub-electronic dial 73, the selection frame (cursor) can be moved, the image can be advanced, and the like. A four-direction key 74 is configured such that each of the up, down, left, and right portions thereof can be pushed, and processing can be performed according to the pressed portion of the four-direction key 74. A SET button 75 is a push button and is mainly used for determining selection items.

A moving image button 76 is used to instruct the start and stop of moving image imaging (recording). An AE lock button 77 is a push button, and by pushing the AE lock button 77 in an imaging standby state, the exposure state can be fixed. An enlargement button 78 is an operation button for switching between ON and OFF of the enlargement mode in the live view display (LV display) of the imaging mode. By operating the main electronic dial 71 after turning on the enlargement mode, the live view image (LV image) can be enlarged or reduced. In the reproduction mode, the enlargement button 78 functions as an operation button for enlarging the reproduced image and increasing the enlargement ratio. A playback button 79 is an operation button for switching between the imaging mode and the playback mode. By pushing the playback button 79 in the imaging mode, a transition is made to the playback mode, and the latest image among the images recorded in the recording medium 200 can be displayed on the display unit 28. A menu button 80 is a push button used to perform an instruction operation for displaying a menu screen. Where the menu button 80 is pushed, a menu screen on which various settings can be made is displayed on the display unit 28. The user can intuitively perform various settings by using the menu screen displayed on the display unit 28, the four-direction key 74, and the SET button 75.

A communication terminal 10 is for the digital camera 100 to communicate with a lens unit 150 (detachable) described hereinbelow. The eyepiece unit 16 is an eyepiece unit of an eyepiece finder (looking-in type finder), and the user can visually recognize an image displayed on the internal EVF 29 through the eyepiece unit 16. The eye proximity detection unit 57 is an eye proximity detection sensor that detects whether the user (person performing imaging) is looking in the eyepiece unit 16. A lid 202 is a lid of a slot in which the recording medium 200 is stored. A grip portion 90 is a holding portion shaped so that the user can easily hold it with his or her right hand when holding the digital camera 100. The mode changeover switch 60, the shutter button 61, and the main electronic dial 71 are arranged at positions where the user can operate them with the index finger of the right hand while holding the digital camera 100 by grasping the grip portion 90 with the little finger, the ring finger, and the middle finger of the right hand. Also, in the same state, a sub-electronic dial 73 is arranged at a position where it can be operated with the thumb of the right hand.

Figure 6:
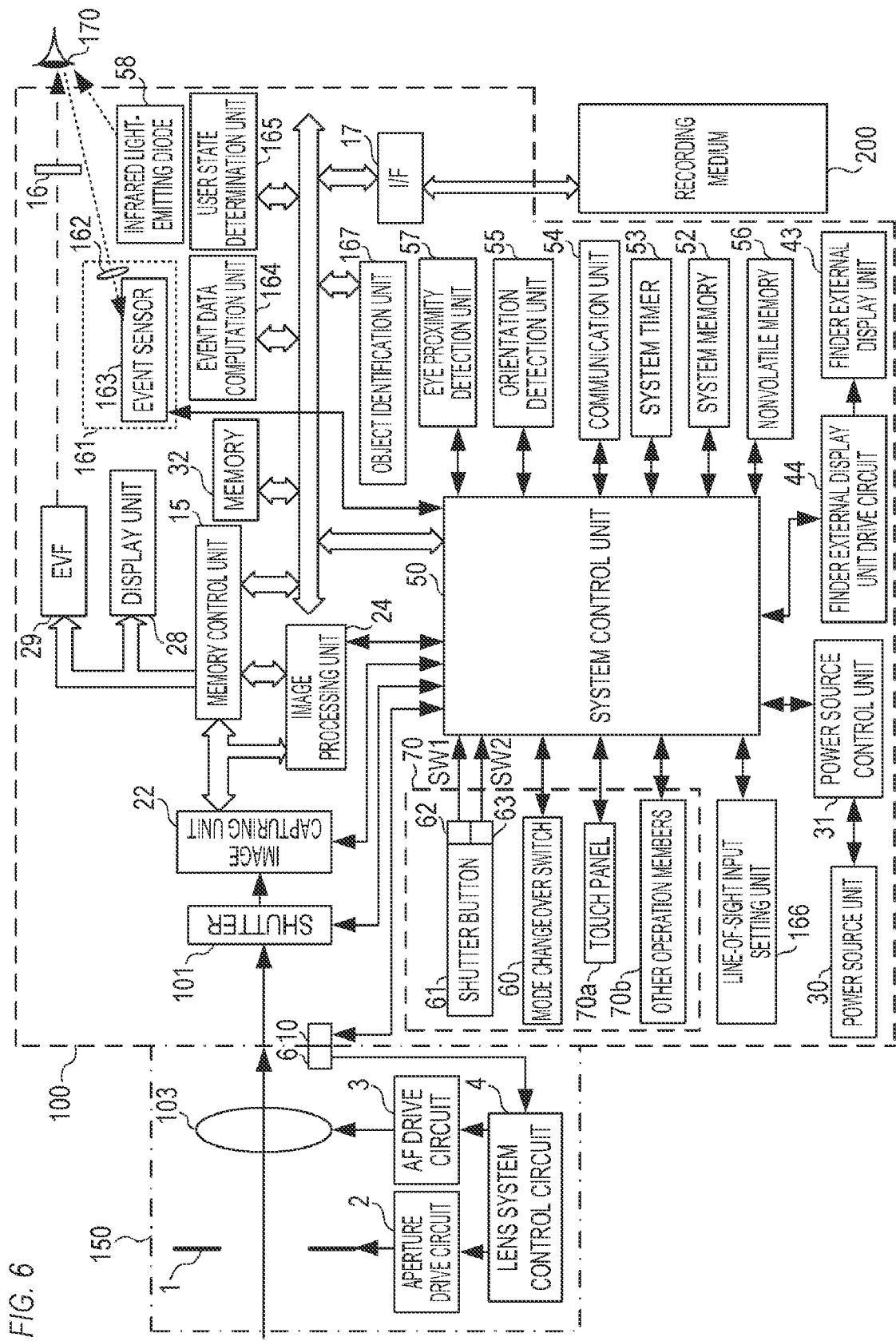
FIG. 6 is a block diagram showing a configuration example of the digital camera.

FIG. 6 is a block diagram showing a configuration example of the digital camera 100. A lens unit 150 is for mounting an interchangeable imaging lens. Although the lens 103 is normally composed of a plurality of lenses, only one lens is shown in FIG. 6 for the sake of simplicity. A communication terminal 6 is for the lens unit 150 to communicate with the digital camera 100 side, and a communication terminal 10 is for the digital camera 100 to communicate with the lens unit 150 side. The lens unit 150 communicates with the system control unit 50 via these communication terminals 6 and 10. The lens unit 150 controls the aperture 1 by the internal lens system control circuit 4 via the aperture drive circuit 2. Also, the lens unit 150 focuses by displacing the lens 103 by the lens system control circuit 4 via the AF drive circuit 3.

A shutter 101 is a focal plane shutter that can freely control the exposure time of the image capturing unit 22 under the control of the system control unit 50.

Various setting values of the digital camera 100 such as the shutter speed and aperture are displayed on the viewfinder external display unit 43 via the viewfinder display unit drive circuit 44.

The communication unit 54 transmits and receives video signals and audio signals to and from an external device connected wirelessly or by a wired cable. The communication unit 54 can be connected to a wireless LAN (Local Area Network) and the Internet. Also, the communication unit 54 can communicate with an external device using Bluetooth (registered trademark) or Bluetooth Low Energy. The communication unit 54 can transmit images (including LV images) captured by the image capturing unit 22 and images recorded in the recording medium 200 and can receive image data and other various types of information from the external device.

The eye proximity detection unit 57 is an eye proximity detection sensor that detects approach (eye proximity) and separation (eye separation) of an eye 170 from the eyepiece unit 16 of the finder (approach detection). The system control unit 50 switches display (display state)/non-display (non-display state) of the display unit 28 and the EVF 29 according to the state detected by the eye proximity detection unit 57. More specifically, at least in the imaging standby state and when the switching of the display destination is automatic switching, when the eye is not in the proximity, the display destination is set to the display unit 28 and the display is turned on while the EVF 29 is set to a non-display state. Further, when the eye is in the proximity, the display destination is set to the EVF 29 and the display is turned on while the display unit 28 is set to a non-display state.

The operation unit 70 is an input unit that receives operations from the user (user operations) and is used to input various operation instructions to the system control unit 50. As shown in FIG. 6, the operation unit 70 includes the mode changeover switch 60, the shutter button 61, the touch panel 70a, and other operation members 70b. The other operation members 70b include the main electronic dial 71, the power switch 72, the sub-electronic dial 73, the four-direction key 74, the SET button 75, the moving image button 76, the AE lock button 77, the enlargement button 78, the playback button 79, the menu button 80, and the like.

The mode changeover switch 60 switches the operation mode of the system control unit 50 to one of a still imaging mode, a moving imaging mode, a playback mode, and the like. Modes included in the still imaging mode include auto imaging mode, auto scene discrimination mode, manual mode, aperture priority mode (Av mode), shutter speed priority mode (Tv mode), and program AE mode (P mode). In addition, there are various scene modes, custom modes, and the like, which are imaging settings for each imaging scene. The mode changeover switch 60 allows the user to switch directly between these modes. Alternatively, after once switching to the list screen of imaging modes with the mode changeover switch 60, selective switching may be performed to any one of the plurality of displayed modes by using another operation member. Similarly, the moving imaging mode may also include multiple modes.

The shutter button 61 includes a first shutter switch 62 and a second shutter switch 63. The first shutter switch 62 is turned ON when the shutter button 61 is being operated, that is, when the shutter button 61 is half-pressed (imaging preparation instruction), and generates a first shutter switch signal SW1. The system control unit 50 starts the imaging preparation operations such as AF (autofocus) processing, AE (auto exposure) processing, AWB (auto white balance) processing, and EF (flash pre-emission) processing in response to the first shutter switch signal SW1. In the AE processing, the system control unit 50 computes and sets an appropriate aperture value, shutter speed, and ISO sensitivity on the basis of the difference between the amount of exposure calculated based on the currently set aperture value, shutter speed, and ISO sensitivity and the predetermined appropriate amount of exposure. The second shutter switch 63 is turned ON when the operation of the shutter button 61 is completed, that is, when the shutter button 61 is fully pressed (imaging instruction), and generates a second shutter switch signal SW2. In response to the second shutter switch signal SW2, the system control unit 50 starts a series of imaging processing operations from signal reading from the image capturing unit 22 to writing of the captured image as an image file on the recording medium 200.

The touch panel 70a and the display unit 28 can be configured integrally. For example, the touch panel 70a is configured so that the light transmittance does not interfere with the display of the display unit 28, and is attached to the upper layer of the display surface of the display unit 28. The input coordinates on the touch panel 70a and the display coordinates on the display surface of the display unit 28 are associated with each other. This makes it possible to provide a GUI (graphical user interface) as if the user could directly operate the screen displayed on the display unit 28.

FIG. 7 is a flowchart showing an operation example of the digital camera 100. Each process in the flowchart of FIG. 7 is implemented by the system control unit 50 expanding the program stored in the nonvolatile memory 56 into the system memory 52 and executing the expanded program to control each functional block. For example, when the digital camera 100 is activated in the still imaging mode, the operation shown in FIG. 7 is started.

The processing of steps S701 to S707 is the same as the processing of steps S301 to S307 in FIG. 3.

In step S708, the system control unit 50 controls the object identification unit 167 to analyze the image acquired in step S701, identifies the type of object, and specifies the size and position of the object on the image. That is, the system control unit 50 detects the object from the image acquired in step S701.

In step S709, the system control unit 50 selects, as AF candidates (candidates of object to be subjected to AF processing), one or more objects from among the objects detected in step S708, and sets the areas of the AF candidates as AF candidate areas (candidates of areas to be subjected to AF processing). For example, the system control unit 50 selects a specific type of object as an AF candidate. The system control unit 50 may select all objects as AF candidates.

In step S710, the system control unit 50 selects an AF area (area to be subjected to AF processing; selection area) from one or more AF candidate areas, which have been set in step S709, based on the gaze area estimated in step S707. For example, the system control unit 50 selects an AF candidate area that overlaps the gaze area as the AF area. This processing can also be regarded as processing for selecting an AF target (a target to be subjected to AF processing) from one or more AF candidates. The AF area and gaze area may be identified by highlight display, frame display, or the like on the EVF 29.

In step S711, the system control unit 50 determines whether the first shutter switch signal SW1 has been detected, that is, whether the shutter button 61 has been half-pressed (imaging preparation instruction). Where the system control unit 50 determines that the first shutter switch signal SW1 has been detected, that is, that the shutter button 61 has been half-pressed (imaging preparation instruction), the process proceeds to step S712. Where the system control unit 50 determines that the first shutter switch signal SW1 has not been detected, that is, that the shutter button 61 has not been half-pressed (imaging preparation instruction), the process returns to step S701.

In step S712, the system control unit 50 calculates the control parameters of the aperture 1 and the drive amount of the focus lens included in the lens 103 so that the object (AF target) in the AF area selected in step S710 is within the depth of field of the lens 103.

In step S713, the system control unit 50 sets appropriate AWB parameters and AE parameters such as ISO sensitivity and shutter speed for the object (AF target) in the AF area selected in step S710. The configuration may be such that the picture style setting or the scene mode is changed according to the AF target.

In step S714, the system control unit 50 performs imaging preparation operations such as AF processing, AE processing, and AWB processing on the basis of various parameters set in steps S712 and S713. In this manner, the system control unit 50 controls the image capturing parameters on the basis of the AF area selected in step S710 in response to the half-pressing of the shutter button 61 (predetermined user operation). For example, the system control unit 50 controls the focal position so that the AF target is in focus, controls the exposure so that the amount of exposure in the AF area approaches a predetermined amount of exposure, or controls the white balance so that the tinge in the AF area approaches a predetermined tinge. The system control unit 50 may control the image capturing parameters on the basis of the AF area even if the shutter button 61 is not half-pressed. For example, the system control unit 50 may repeat control of the image capturing parameters based on the AF area at a predetermined cycle.

In step S715, the system control unit 50 determines whether the second shutter switch signal SW2 has been detected, that is, whether the shutter button 61 has been fully pressed (imaging instruction). Where the system control unit 50 determines that the second shutter switch signal SW2 has been detected, that is, that the shutter button 61 has been fully pressed (imaging instruction), the process proceeds to step S719. Where the system control unit 50 determines that the second shutter switch signal SW2 has not been detected, that is, that the shutter button 61 has not been fully pressed (imaging instruction), the process proceeds to step S716.

The processing of steps S716 and S717 is the same as steps S701 and S702.

In step S718, the system control unit 50 controls the object identification unit 167 to detect and track the object (AF target) in the AF area selected in step S710. At this time as well, the AF area and the gaze area may be made identifiable on the EVF 29 by highlight display, frame display, or the like.

In step S719, the system control unit 50 completes a series of imaging processes (still image imaging) until the image captured by the image capturing unit 22 is written to the recording medium 200 as a still image file.

A specific example of the operation of the digital camera 100 will be described using FIGS. 8A and 8B.

Figure 8A:
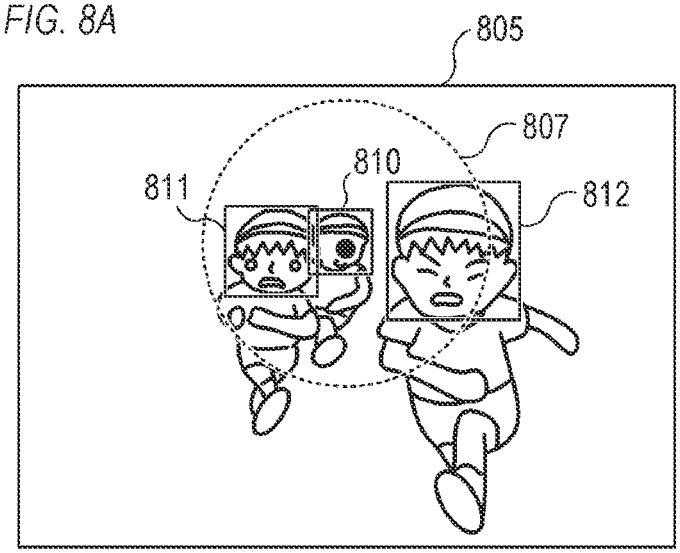
FIGS. 8A and 8B are diagrams for explaining a specific example of the operation of the digital camera.

FIG. 8A shows a display example of the EVF 29 in a case where the gaze area is relatively wide. An image 805 is the image displayed in step S702 of FIG. 7 and includes a plurality of persons at different positions in the depth direction. An area 807 is the gaze area estimated in step S707, and the black dot located at the center of the area 807 is the gaze position determined in step S706. In FIG. 8A, it is assumed that areas 810 to 812, all of which are human face areas, are set as AF candidate areas in step S709.

With the method of selecting the AF area on the basis of line-of-sight position of one point, even if the user wants to select all of the areas 810 to 812 as the AF area, such selection cannot be made. Also, even if the user wants to select the area 810 as the AF area, since the area 811 overlaps the area 810 (the area 811 is close to the area 810), the area 811 may be selected as the AF area due to user's unintended eye movement (fixational eye movement, etc.). In other words, it is difficult to make a selection that matches the user's intention. In Embodiment 2, it is possible to make a selection that matches the user's intention by considering the gaze area.

Since all of the areas 810 to 812 overlap the gaze area 807, all of the areas 810 to 812 are selected as the AF areas in step S710. Therefore, in FIG. 8A, solid-line frames indicating areas 810 to 812 are displayed.

Figure 8B:
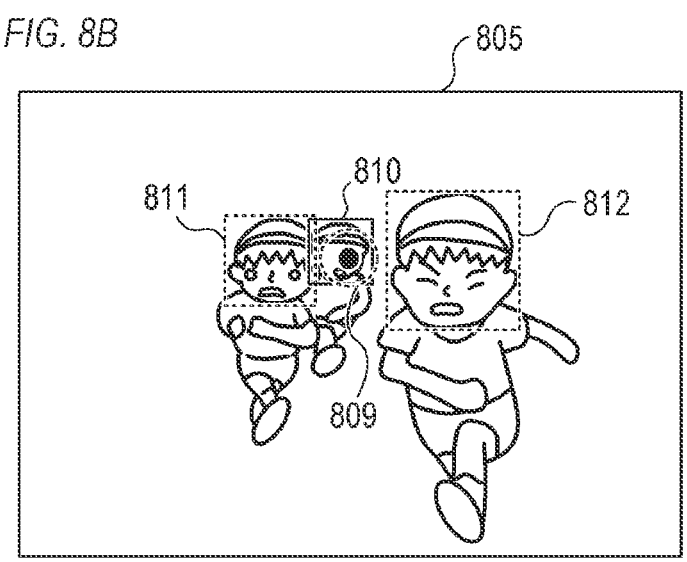

FIG. 8B shows a display example of the EVF 29 in a case where the gaze area is relatively narrow. An area 809 is the gaze area estimated in step S707, and the black dot located at the center of the area 809 is the gaze position determined in step S706. In FIG. 8B, as in FIG. 8A, it is assumed that areas 810 to 812, all of which are human face areas, are set as AF candidate areas in step S709. However, since only the area 810 (the face area of the farthest person) overlaps the gaze area 807, only the area 810 is selected as the AF area in step S710. Therefore, in FIG. 8B, a solid line frame indicating the area 810 is displayed. In FIG. 8B, dashed frames indicating areas 811 and 812 are displayed, but such dashed frames may not be displayed.

Thus, in a case where the user's gaze area is large, more AF candidate areas (AF candidates) are selected as the AF areas (AF targets) than in a case where the gaze area is small. In other words, in a case where the gaze area is small, fewer AF candidate areas are selected as the AF areas than in a case where the gaze area is large. As described in Embodiment 1, the larger the gaze area, the larger the microsaccades tend to be. Therefore, in a case where the user's microsaccades are large, more AF candidate areas are selected as the AF areas than in a case where the user's microsaccades are small, and the focal position is controlled so that the objects in the selected AF areas are in focus. A case where the microsaccades are large includes a case where the amplitude of the microsaccades is large, a case where the occurrence frequency of the microsaccades is high, a case where the attenuation rate of the microsaccades is small (high vibration property), and the like. A case where the microsaccades are small includes a case where the amplitude of the microsaccades is small, a case where the occurrence frequency of the microsaccades is low, a case where the attenuation rate of the microsaccades is large (low vibration property), and the like.

The focal position may be controlled so that more object are focused in a case where the user's microsaccades are large than in a case where the user's microsaccades are small, without clearly performing the AF area selection process. Where the size of the microsaccades is the first size, the focal position is controlled so as to focus on a plurality of objects. Where the size of the microsaccades is the second size smaller than the first size, the focal position is controlled so that only the deepest object among the plurality of objects is focused. For example, in a case where the amplitude of the microsaccades is the first amplitude, the focal position is controlled so as to focus on a plurality of objects. In a case where the amplitude of the microsaccades is the second amplitude smaller than the first amplitude, the focal position is controlled so that only the deepest object among the plurality of objects is focused. Where the occurrence frequency of microsaccades is the first frequency, the focal position is controlled so as to focus on a plurality of objects. Where the occurrence frequency of microsaccades is the second frequency lower than the first frequency, the focal position is controlled so that only the deepest object among the plurality of objects is in focus. Where the attenuation rate of the microsaccades is the first value, the focal position is controlled so as to focus on the plurality of object. Where the attenuation rate of microsaccades is the second value larger than the first value, the focal position is controlled so that only the deepest object among the plurality of objects is focused.

As described above, according to Embodiment 2, a selection area (AF area) is selected from one or more candidate areas (AF candidate areas) on the basis of the gaze area of the user. This enables selection that matches the user's intention. For example, it is difficult to select a plurality of candidate areas as selection areas by selection using a pointer or selection by a line-of-sight position, but according to Embodiment 2, a plurality of candidate areas can be easily selected as selection areas.

In addition, in the configuration of Embodiment 2, the image displayed on the EVF 29 is viewed by the user, but the present disclosure is not limited to this configuration. For example, the present disclosure can also be applied when the user looks through an optical viewfinder and sees an object. In that case, the object may be detected from the image capturing area (predetermined area), and the area of the detected object may be set as the candidate area.

In Embodiment 2, one or more objects are selected as AF candidates from the detected objects, and the area of AF candidate is set as the AF candidate area. However, the present disclosure is not limited to this configuration. The AF candidate area may be set in any manner. For example, the AF candidate area may be a predetermined fixed area or an area designated by the user such as zone AF.

In Embodiment 2, in step S710, the AF candidate area that overlaps the gaze area is selected as the AF area, but the definition of the AF candidate area that overlaps the gaze area can be changed as appropriate. For example, a configuration may be such that an AF candidate area that slightly overlaps the gaze area may be selected as the AF area, or a configuration may be such that an AF candidate area that only slightly overlaps the gaze area may not be selected as the AF area. A configuration may be such that an AF candidate area in which a portion of a predetermined or greater percentage overlaps the gaze area is selected as the AF area. Where the size of the gaze area is larger than a predetermined threshold, it can be determined that the user has a bird's eye view on the scene, and therefore, in such a case, a configuration may be adopted in which an AF area is not selected.

In the configuration of Embodiment 2, after detecting the first shutter switch signal SW1 in step S711, various parameters are always set based on the AF area selected in step S710, but the present disclosure is not limited to this configuration. Even after detecting the first shutter switch signal SW1, the estimation of the gaze area may be continued to update the AF area.

In the configuration of Embodiment 2, the aperture, AF, AWB, and AE parameters are set in steps S712 and S713, but the present disclosure is not limited to this configuration. The configuration may be such that other parameters related to control of the digital camera 100 are changed.

In Embodiment 2, the case of still image imaging has been described, but the present disclosure can also be applied to the case of moving image imaging. In the configuration of Embodiment 2, the AF area is selected, but the present disclosure is not limited to this configuration. A selection area may be selected from one or more candidate areas on the basis of the gaze area of the user, and the use of the selection area is not particularly limited.

In the configuration of Embodiment 2, the image captured by the image capturing unit 22 is displayed on the EVF 29, but the present disclosure is not limited to this configuration. For example, the present disclosure can also be applied to an electronic device that does not include the image capturing unit 22. A moving image (moving image data) stored in the recording medium 200 may be acquired and reproduced and displayed on the display unit.

In the configuration of Embodiment 2, the area of the person's face is set as the AF candidate area, but the present disclosure is not limited to this configuration. For example, areas such as the eyes, body parts, and entire body of a person may be set as the AF candidate areas. Areas such as eyes, head, body, and whole of animals may be set as the AF candidate areas. Areas such as vehicles, plants, and food may be set as the AF candidate areas.

Figure 9A:
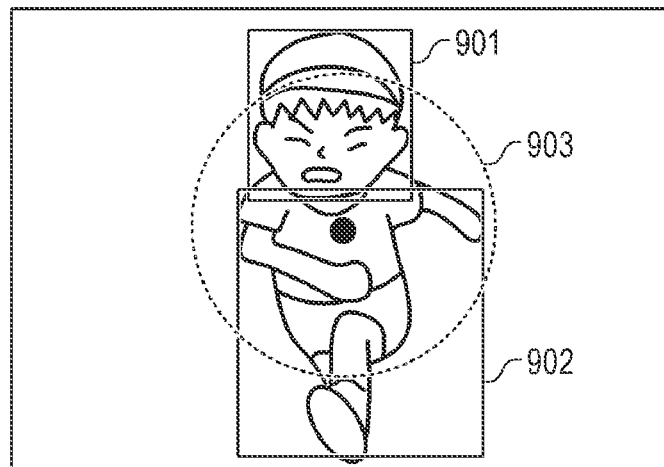
FIGS. 9A to 9C are diagrams showing display examples of the digital camera.
Figure 9B:
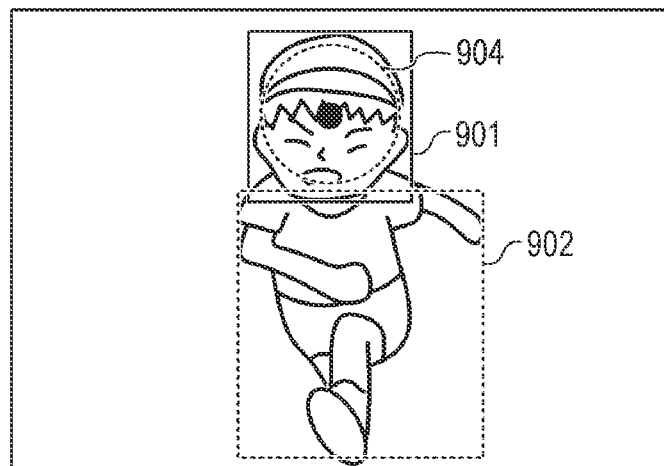
Figure 9C:
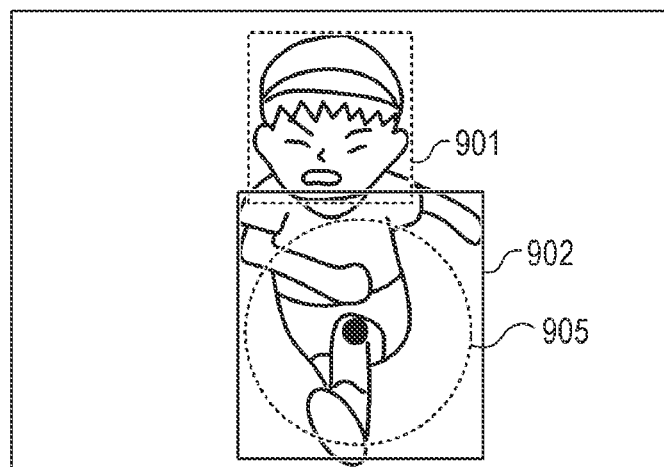

Display examples of the EVF 29 are shown in FIGS. 9A to 9C. In FIGS. 9A to 9C, an area 901 of a person's face and an area 902 of a person's body are set as AF candidate areas. In FIG. 9A, both areas 901 and 902 overlap the gaze area 903, so both areas 901 and 902 are selected as the AF areas. In FIG. 9B, only the area 901 overlaps the gaze area 904, so only the area 901 is selected as the AF area. In FIG. 9C, only the area 902 overlaps the gaze area 905, so only the area 902 is selected as the AF area.

Figure 10A:
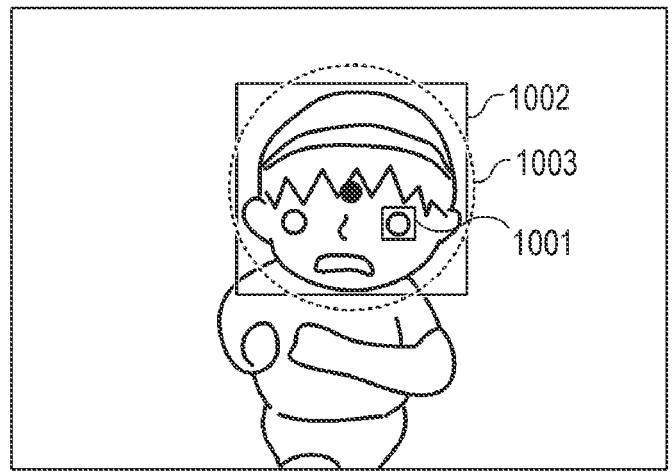
FIGS. 10A and 10B are diagrams showing display examples of the digital camera.
Figure 10B:
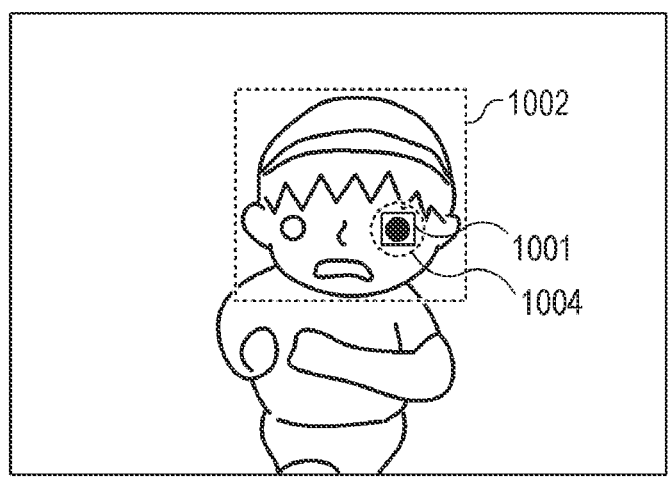

Display examples of the EVF 29 are shown in FIGS. 10A and 10B. Here, it is assumed that an AF candidate area in which a portion of a predetermined or greater percentage overlaps the gaze area is selected as the AF area. In FIGS. 10A and 10B, an area 1001 of a person's eye and an area 1002 of a person's face are set as the AF candidate areas. In FIG. 10A, both areas 1001 and 1002 are selected as the AF areas because both areas 1001 and 1002 overlap the gaze area 1003 at a percentage equal to or greater than the predetermined percentage. In FIG. 10B, the area 1002 only slightly (less than a predetermined percentage) overlaps gaze area 1003, and only the area 1001 overlaps gaze area 1004 at a percentage greater than or equal to the predetermined percentage. Therefore, only the area 1001 is selected as the AF area.

Two embodiments according to the present disclosure have been described, but the present disclosure is not limited to these specific embodiments, and includes various forms within the scope of the present disclosure. Furthermore, the two embodiments described above are merely exemplary, and it is also possible to combine the two embodiments.

For example, the control of the system control unit 50 may be performed by one piece of hardware, or the entire device may be controlled by a plurality of pieces of hardware (for example, a plurality of processors or circuits) sharing the processing.

In Embodiments 1 and 2, the event sensor 163 is used to estimate the gaze area. The event-based sensor is characterized by being able to acquire data with lower power and higher latency than a frame-based sensor, but the present disclosure is not limited to this configuration. For example, a frame-based sensor with a high frame rate may be used if power consumption and data transfer amount are acceptable. An event-based sensor and a frame-based sensor may be used together. A method such as an EOG method may be used in which an electrode attached to the periphery of the orbit detects potential fluctuations associated with eye movement.

In Embodiments 1 and 2, the gaze area is estimated by paying attention to the microsaccade motion. By paying attention to the microsaccade motion, the gaze area can be estimated relatively quickly, but the present disclosure is not limited to this configuration. The gaze position transition may be recorded as history information, and the gaze area may be estimated from the gaze position transition in a predetermined period of time.

The present disclosure is applicable to any electronic device that has the necessary configuration requirements. For example, the present disclosure may be applied to digital telescopes, digital microscopes, and the like. The present disclosure may be applied to display devices such as image viewers with cameras. The present disclosure may be applied to personal computers, PDAs, mobile phone terminals, game machines, and the like. By applying the present disclosure to any electronic device, it becomes possible to make a selection that matches the user's intention.

According to the present disclosure, it is possible to make a selection that match the user's intentions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-201782, filed on Dec. 13, 2021, which is hereby incorporated by reference herein in its entirety.

What is claimed is:

1. An electronic device comprising:
   at least one memory storing instructions; and
   at least one processor which, upon execution of the instructions, configures the at least one processor to function as:
   an estimation unit configured to estimate a gaze area of a user;
   a detection unit configured to detect one or more objects present in a gaze direction of the user; and
   a selection unit configured to select one object from the one or more objects on a basis of the gaze area, wherein
   in a case where a plurality of objects is detected by the detection unit, the selection unit selects the one object by comparing a size of the gaze area and a size of each of the plurality of objects.

2. The electronic device according to claim 1, wherein the selection unit selects, from the plurality of objects, an object with a size closest to the size of the gaze area.

3. The electronic device according to claim 2, wherein the selection unit selects, from the plurality of objects, an object with a size ratio as compared to the gaze area that is closest to 1.

4. The electronic device according to claim 1, wherein the selection unit selects, from the plurality of objects, an object with a size ratio as compared to the gaze area that is within a predetermined range.

5. The electronic device according to claim 1, wherein the detection unit detects an object that overlaps the gaze area.

6. The electronic device according to claim 1, wherein execution of the stored instructions further configures the at least one processor to function as:
   a control unit configured to control to perform processing based on a selection result of the selection unit.

7. The electronic device according to claim 6, wherein the control unit causes display, on a display device, information related to the object selected by the selection unit.

8. The electronic device according to claim 1, wherein execution of the stored instructions further configures the at least one processor to function as:
   an acquisition unit configured to acquire eyeball information related to an eye condition of the user, and
   the estimation unit estimates the gaze area based on the eyeball information.

9. The electronic device according to claim 8, wherein the eyeball information includes gaze position information related to a gaze position and microsaccade information related to at least one of an occurrence frequency and amplitude of microsaccades.

10. The electronic device according to claim 8, wherein the acquisition unit acquires the eyeball information from a detection result of an event-based vision sensor.

11. The electronic device according to claim 1, wherein the selection unit does not select an object in a case where a size of the gaze area is larger than a predetermined threshold.

12. An electronic device comprising:
at least one memory storing instructions; and
at least one processor which, upon execution of the instructions, configures the at least one processor to function as:
a selection unit configured to select one object from one or more objects present in a gaze direction of a user, wherein
the selection unit selects a larger object in a case where microsaccades of the user are large than in a case where the microsaccades of the user are small, and
the selection unit selects a larger object in a case where an occurrence frequency of the microsaccades is large than in a case where the occurrence frequency of the microsaccades is small.

13. The electronic device according to claim 12, wherein the selection unit selects a larger object in a case where an amplitude of the microsaccades is large than in a case where the amplitude of the microsaccades is small.

14. The electronic device according to claim 12, wherein the selection unit selects a larger object in a case where an attenuation rate of the microsaccades is small than in a case where the attenuation rate of the microsaccades is large.

15. A control method of an electronic device, comprising:
estimating a gaze area of a user;
detecting one or more objects present in a gaze direction of the user; and
selecting one object from the one or more objects on a basis of the gaze area, wherein
in a case where a plurality of objects is detected, in the selecting the one object is selected by comparing a size of the gaze area and a size of each of the plurality of objects.

16. A non-transitory computer readable medium that stores instructions that, when executed by a computer, causes a control method for an electronic device to be performed, the control method comprising:
estimating a gaze area of a user;
detecting one or more objects present in a gaze direction of the user; and
selecting one object from the one or more objects on a basis of the gaze area, wherein
in a case where a plurality of objects is detected, in the selecting the one object is selected by comparing a size of the gaze area and a size of each of the plurality of objects.

* * * * *